UNITED STATES PATENT OFFICE.

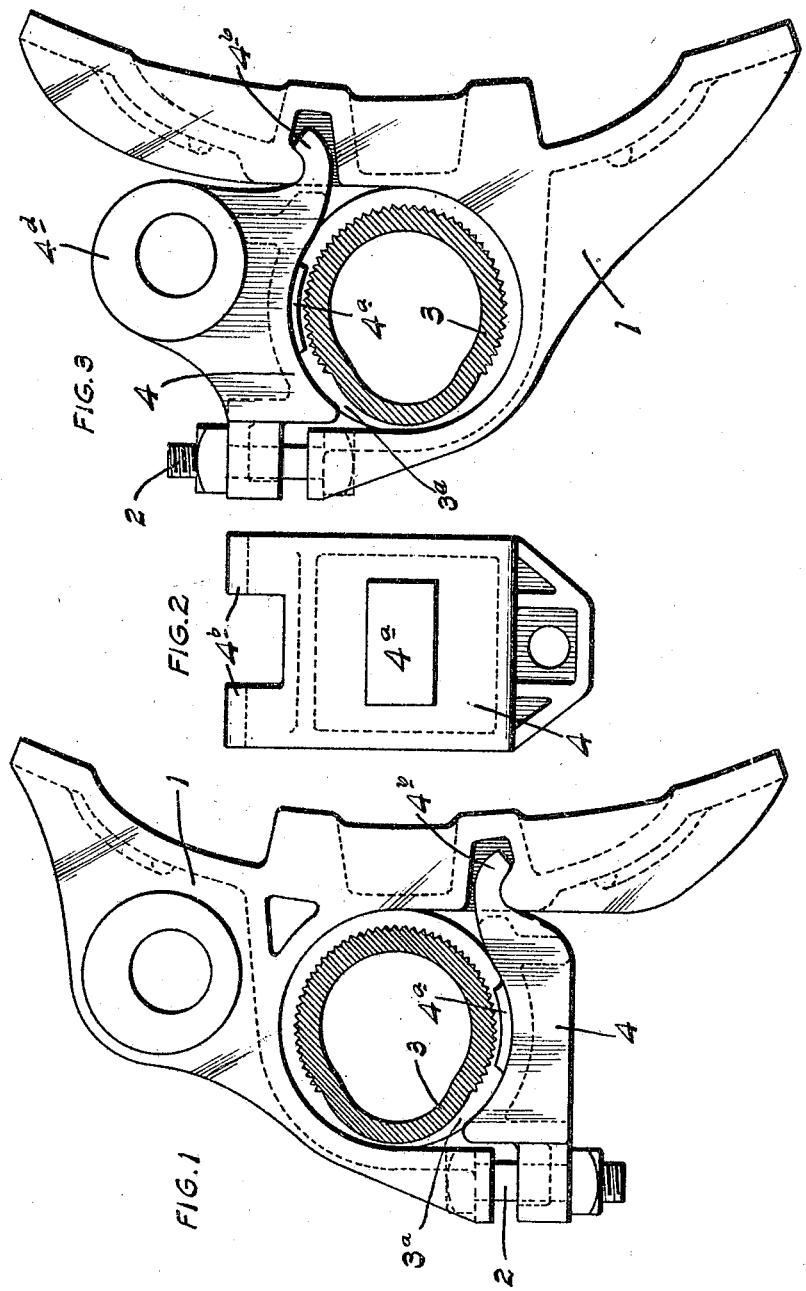

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

BRAKE-HEAD.

1,045,261.   Specification of Letters Patent.   Patented Nov. 26, 1912.

Application filed December 29, 1911. Serial No. 668,547.

*To all whom it may concern:*

Be it known that I, FREDERICK R. CORNWALL, a citizen of the United States, residing at St. Louis, Missouri, have invented a certain new and useful Improvement in Brake-Heads, of which the following is a full, clear, and exact description, such as will enable others skilled in the art to which it appertains to make and use the same, reference being had to the accompanying drawings, forming part of this specification.

Figure 1 is a side elevational view of my improved brake head. Fig. 2 is a plan view of the removable wall. Fig. 3 is a modified form.

This invention relates to a new and useful improvement in brake heads for use in connection with trussed or solid brake beams, the object being to provide the head with a removable wall which will permit the beam to be unhung without detaching the head from the brake hanger, or by connecting the movable wall to the brake hanger to permit the head and beam to be removed for purposes of renewal or repair.

An important feature of my invention resides in the fact that the beam can be unhung or the head removed without requiring any considerable play of the parts except in a vertical direction, and in inside hung beams, where there is comparatively little space for the brake beam and heads, this is a desirable feature.

In the drawings 1 indicates the brake head of any ordinary or approved construction, the rear wall of the socket of which is preferably provided with a seat for the head of a bolt 2.

3 is the sleeve on which the head is mounted, said sleeve having a circumferential groove provided with serrations in its bottom as is frequently employed with adjustable brake heads. While I have illustrated this form of sleeve which is usually identified with trussed beams, it is obvious that my improved brake head could be mounted on solid beams.

4 is a removable wall having a lug extension 4ª which is designed to fit in the groove to prevent longitudinal displacement of the head. The inner surface of this removable wall is preferably curved so as to bear upon the flanges 3ª of the sleeve 3 and hold the brake head in adjusted positions by friction; but, if desired the lug extension 4ª may be serrated to coöperate with the serrations of the sleeve. The front end of this removable wall 4 is provided with a projection 4ᵇ which is received in a seat in the brake head to coöperate with a curved bearing lip which acts as a fulcrum. The outer end of the removable wall is provided with an opening through which the bolt 2 passes, a nut being threaded on said bolt to impinge against the removable wall and hold the same in position. While I have shown this bottom wall as entirely removable, it is obvious that it could be pivoted to the brake head so that it would swing down to permit the beam to drop.

In operation, if it is desired to unhang the beam, the nut is removed from the bolt and the bottom wall taken out which will permit the brake beam to drop vertically through the opening thus provided. The parts of course may be re-assembled by lifting the brake beam into position and replacing the removable wall and securing it in position.

In Fig. 3 I have shown a modified form in which the wall is arranged at the top and provided with perforated lugs 4ᵈ for the attachment of the brake hanger. By this construction, the head may be removed with the beam and when the beam is unhung, the head is in readiness to be separated therefrom without requiring the removal of any fastening devices between the head and beam.

What I claim is;

1. A brake head provided with means whereby it may be adjustably secured to a brake beam and having an opening in one wall of its socket of such size as to permit the introduction and removal of the brake beam therethrough in a vertical direction, and means for securing the head on the beam in adjusted position.

2. A brake head adapted to be adjustably mounted on a brake beam and having an opening through one of its socket walls of such size and in such position as to permit the removal of the brake beam therethrough in a direction longitudinally of the head while a portion of the head remains connected to the hanger.

3. A brake head provided with means for adjustably securing it on a brake beam and having an opening through its socket wall, which opening opens in a direction longitudinally of the head, and is of size to permit the removal of the brake beam therethrough, and a movable member pivoted on the head spanning said opening to hold the brake beam in position in the head.

4. The combination of a brake beam, a brake head adjustably mounted thereon and means carried by said brake head for holding the same in adjusted position on the beam, said means also constituting connection with the brake hanger whereby, upon the removal of said means, the brake beam is unhung and the brake head disconnected from the beam.

5. The combination of a brake head having an opening through its socket wall through which the beam may be inserted and removed, a removable wall pivotally connected to said head at one end and provided with removable fastening devices at its other end, a sleeve having a circumferential groove on which the head is mounted, and a projection on said removable wall extending into the groove of said sleeve.

6. A brake head having a removable wall permitting the removal of the beam longitudinally of the head, said wall being provided with a curved lip at one end for engagement with the brake head, one face of said wall being curved to coöperate with the part of the brake beam on which the head is mounted, a projection extending from said curved face, and a perforated lug extending from the opposite end of said wall for coöperating with a fastening device.

7. An adjustable brake head made in parts and having an opening in its socket wall so arranged to permit the removal of the brake beam therefrom in a vertical line, while one of said parts remains connected to the hanger.

In testimony whereof I hereunto affix my signature in the presence of two witnesses, this 27th day of December, 1911.

FREDERICK R. CORNWALL.

Witnesses:
M. P. SMITH,
LILY ROST.